(12) United States Patent
George

(10) Patent No.: US 10,863,734 B1
(45) Date of Patent: Dec. 15, 2020

(54) PORTABLE HUNTING BLIND CHAIR

(71) Applicant: Timothy George, Oxford, OH (US)

(72) Inventor: Timothy George, Oxford, OH (US)

(*) Notice: Subject to any disclaimer, the term of this patent is extended or adjusted under 35 U.S.C. 154(b) by 0 days.

(21) Appl. No.: 16/565,626

(22) Filed: Sep. 10, 2019

(51) Int. Cl.
*A01M 31/02* (2006.01)
*A47C 7/66* (2006.01)
*E04H 15/00* (2006.01)
*A47C 3/40* (2006.01)
*A47C 4/28* (2006.01)

(52) U.S. Cl.
CPC ............ *A01M 31/025* (2013.01); *A47C 3/40* (2013.01); *A47C 4/286* (2013.01); *A47C 7/666* (2018.08); *E04H 15/001* (2013.01); *Y10S 135/901* (2013.01)

(58) Field of Classification Search
CPC .... A01M 31/025; Y10S 135/901; A47C 7/66; A47C 7/666; A47C 4/283; A47C 4/286
USPC .................. 135/901; 297/45, 184.14, 184.17
See application file for complete search history.

(56) References Cited

U.S. PATENT DOCUMENTS

| 1,196,207 | A | * | 8/1916 | Cane | E04H 15/003 135/130 |
| 2,811,977 | A | * | 11/1957 | McClish | E04H 15/38 297/184.14 |
| 3,007,735 | A | * | 11/1961 | Cohn | A47G 9/1045 297/184.17 |
| 3,131,704 | A | * | 5/1964 | Shimon | E04H 15/001 297/184.14 |
| 3,509,891 | A | * | 5/1970 | De Bolt | A01K 97/01 135/148 |
| 4,915,120 | A | * | 4/1990 | Ziolkowski | A47C 7/66 135/117 |
| 5,320,405 | A | * | 6/1994 | Foster | A47C 7/66 135/133 |
| D378,540 | S | * | 3/1997 | Becker | D25/16 |
| 6,036,148 | A | | 3/2000 | Shank | |
| 6,871,911 | B2 | | 3/2005 | Alexander, Jr. | |
| D512,576 | S | | 12/2005 | Szyperski | |
| 7,427,101 | B1 | * | 9/2008 | Zernov | A47C 7/66 135/96 |
| 7,527,331 | B2 | | 5/2009 | Fargason, III | |
| 7,997,291 | B2 | | 8/2011 | Gressette | |
| 8,091,962 | B2 | * | 1/2012 | Quinn | A47C 7/66 297/184.16 |
| 9,033,105 | B1 | * | 5/2015 | Boswell | E04H 15/001 182/116 |
| 9,072,290 | B1 | * | 7/2015 | McCauley | A01M 31/025 |

(Continued)

FOREIGN PATENT DOCUMENTS

| DE | 2210196 A1 | * | 9/1973 | ............... A47C 7/66 |
| FR | 787187 A | * | 9/1935 | ............. A47C 4/283 |

(Continued)

*Primary Examiner* — Robert Canfield

(57) ABSTRACT

The portable hunting blind chair is a portable structure. The portable hunting blind chair is a hunting blind. The portable hunting blind chair comprises a chair, a blind, and a bag. The chair is a folding and telescopic structure used for siting. The blind forms an exterior shell around the chair. The blind is a collapsible shelter. The blind is adjustable such that the field of view from the blind is adjustable. The blind attaches to the chair using a threaded connection. The bag is a containment structure that contains the portable hunting blind chair for transportation and storage.

15 Claims, 11 Drawing Sheets

(56) References Cited

U.S. PATENT DOCUMENTS

| | | | | |
|---|---|---|---|---|
| 9,451,829 B2* | 9/2016 | Chen | ........................ | A47C 4/286 |
| 10,426,270 B2* | 10/2019 | Beaulieu | ................... | A47C 7/66 |
| 2004/0051009 A1* | 3/2004 | Chen | ........................ | A47B 3/02 |
| | | | | 248/163.1 |
| 2006/0220424 A1* | 10/2006 | Fargason, III | .......... | A01K 97/01 |
| | | | | 297/184.17 |
| 2009/0243345 A1* | 10/2009 | Carter | ..................... | A47C 7/407 |
| | | | | 297/16.2 |
| 2010/0045081 A1* | 2/2010 | Efthimiou | ................ | A47C 7/66 |
| | | | | 297/184.11 |
| 2010/0096890 A1* | 4/2010 | Whitlock | ................ | A47D 1/023 |
| | | | | 297/16.2 |
| 2010/0314914 A1* | 12/2010 | Mazzola | ................... | A47C 3/34 |
| | | | | 297/16.2 |
| 2012/0123192 A1* | 5/2012 | Somsundaram | ...... | A61G 7/0526 |
| | | | | 600/28 |
| 2017/0265646 A1* | 9/2017 | Rowe, Jr. | .................. | A47C 7/66 |

FOREIGN PATENT DOCUMENTS

| | | | | |
|---|---|---|---|---|
| JP | 3093218 U * | 4/2003 | .............. | A47C 4/286 |
| WO | WO-2010081089 A1 * | 7/2010 | .............. | A47C 4/44 |
| WO | 2013028779 | 2/2013 | | |
| WO | WO-2016112223 A2 * | 7/2016 | .............. | A47C 4/286 |

* cited by examiner

PORTABLE HUNTING BLIND CHAIR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture and hunting including hunting appliances, more specifically, a hunting blind. (A01M31/025)

SUMMARY OF INVENTION

The portable hunting blind chair is a portable structure. The portable hunting blind chair is a hunting blind. The portable hunting blind chair comprises a chair, a blind, and a bag. The chair is a folding and telescopic structure used for siting. The blind forms an exterior shell around the chair. The blind is a collapsible shelter. The blind is adjustable such that the field of view from the blind is adjustable. The blind attaches to the chair using a threaded connection. The bag is a containment structure that contains the portable hunting blind chair for transportation and storage.

These together with additional objects, features and advantages of the portable hunting blind chair will be readily apparent to those of ordinary skill in the art upon reading the following detailed description of the presently preferred, but nonetheless illustrative, embodiments when taken in conjunction with the accompanying drawings.

In this respect, before explaining the current embodiments of the portable hunting blind chair in detail, it is to be understood that the portable hunting blind chair is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the portable hunting blind chair.

It is therefore important that the claims be regarded as including such equivalent construction insofar as they do not depart from the spirit and scope of the portable hunting blind chair. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
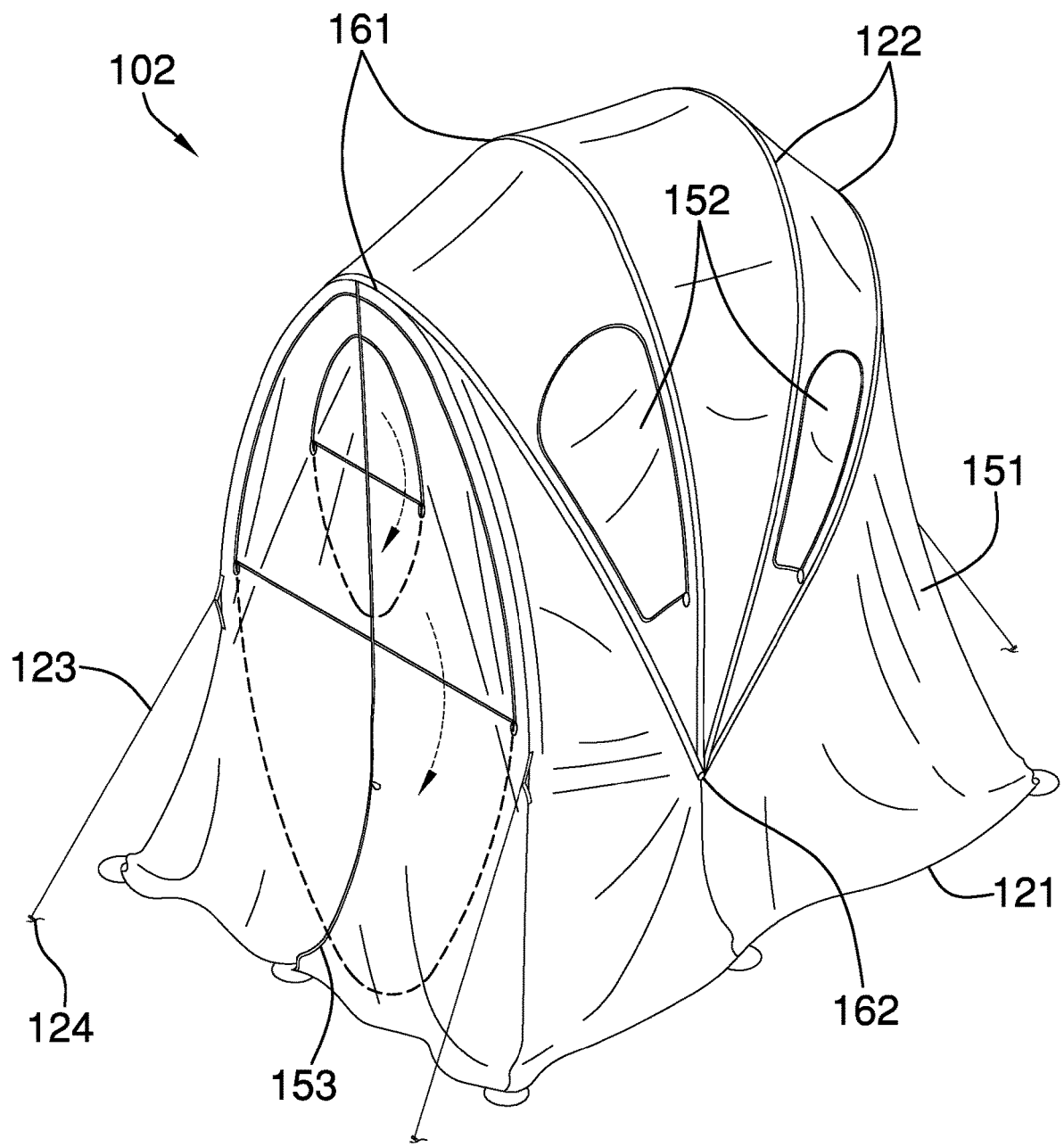
FIG. 1 is a perspective view of an embodiment of the disclosure.
Figure 2:
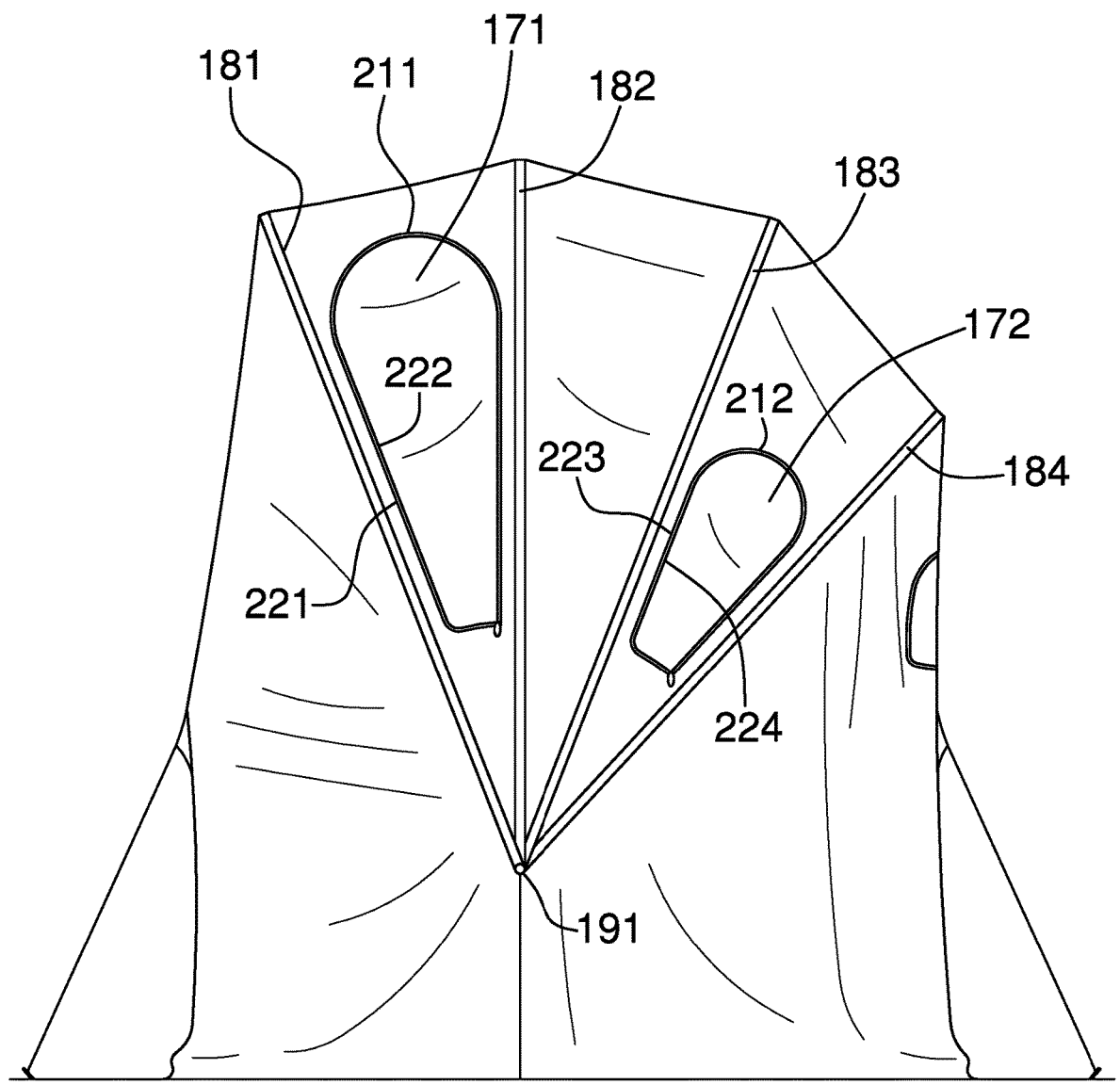
FIG. 2 is a side view of an embodiment of the disclosure.
Figure 3:
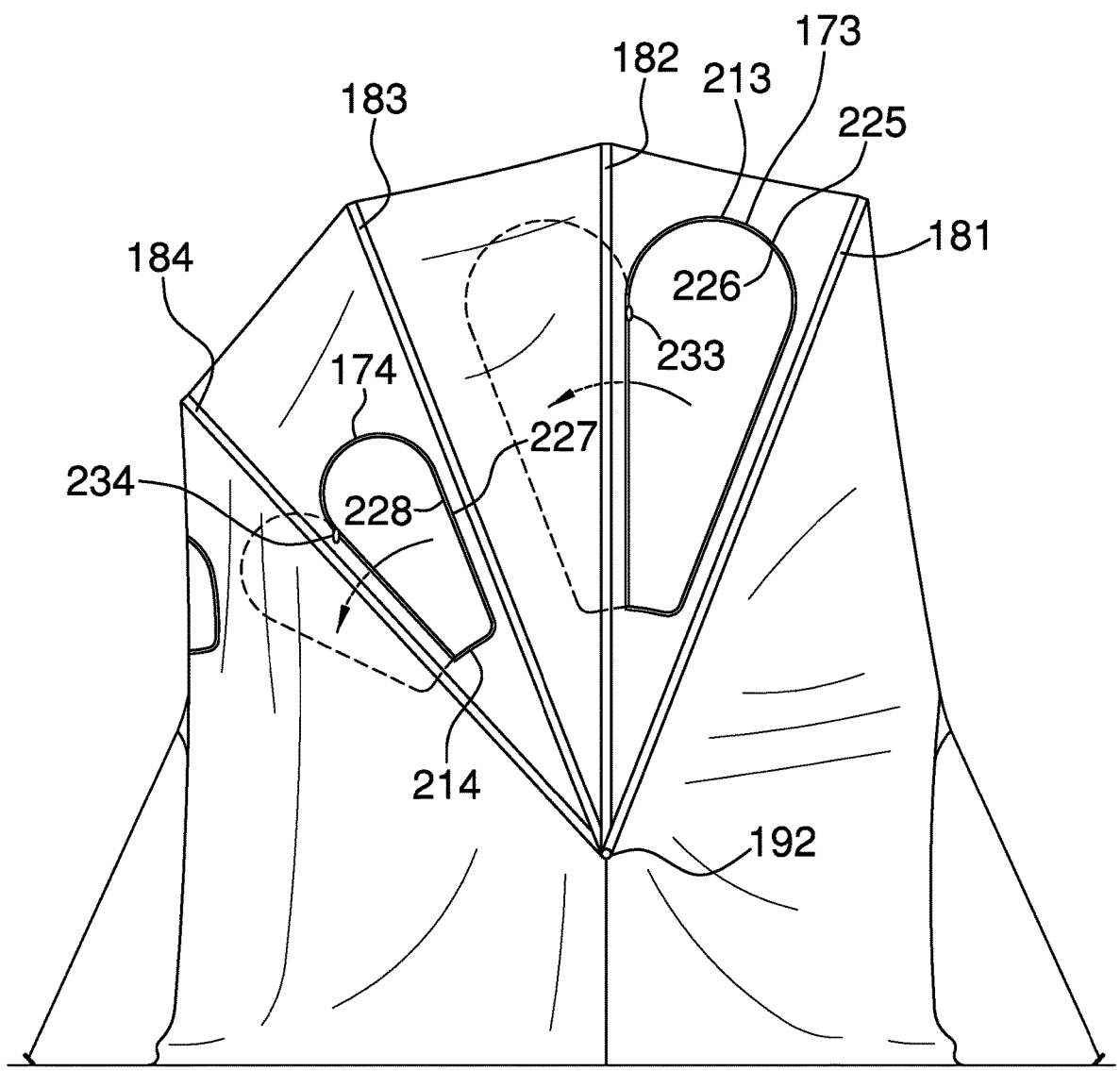
FIG. 3 is a side view of an embodiment of the disclosure.
Figure 4:
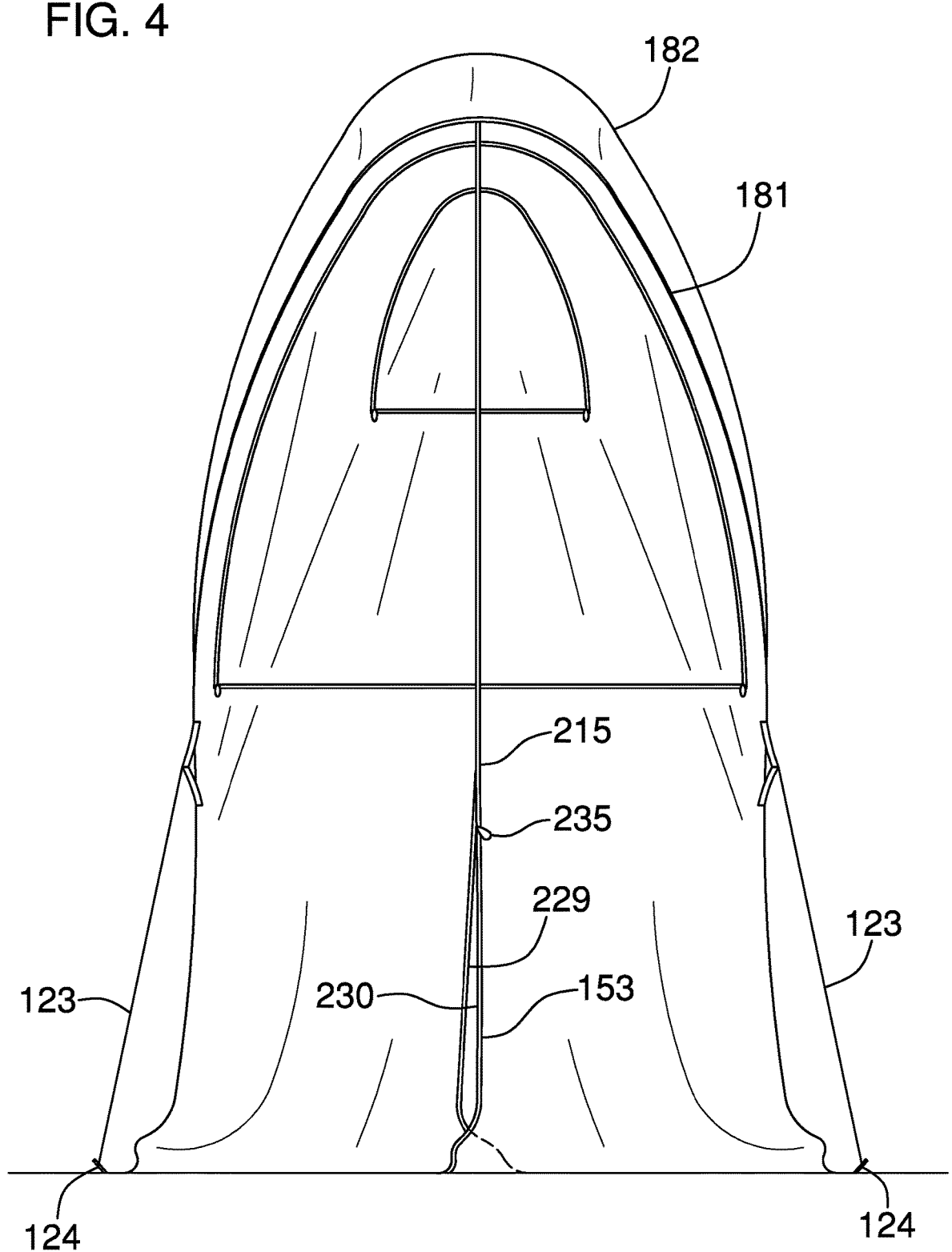
FIG. 4 is a front view of an embodiment of the disclosure.
Figure 5:
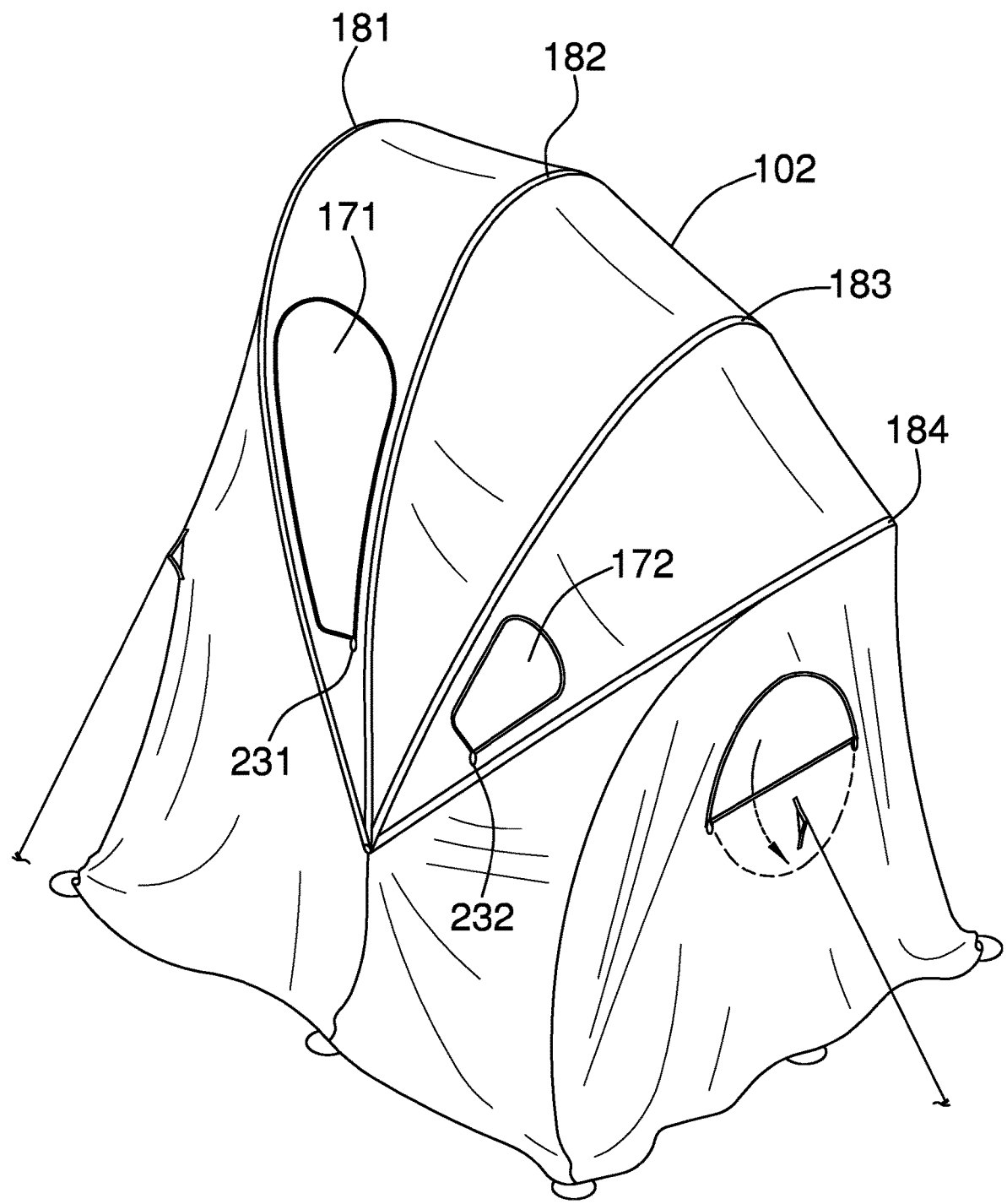
FIG. 5 is a rear view of an embodiment of the disclosure.
Figure 6:
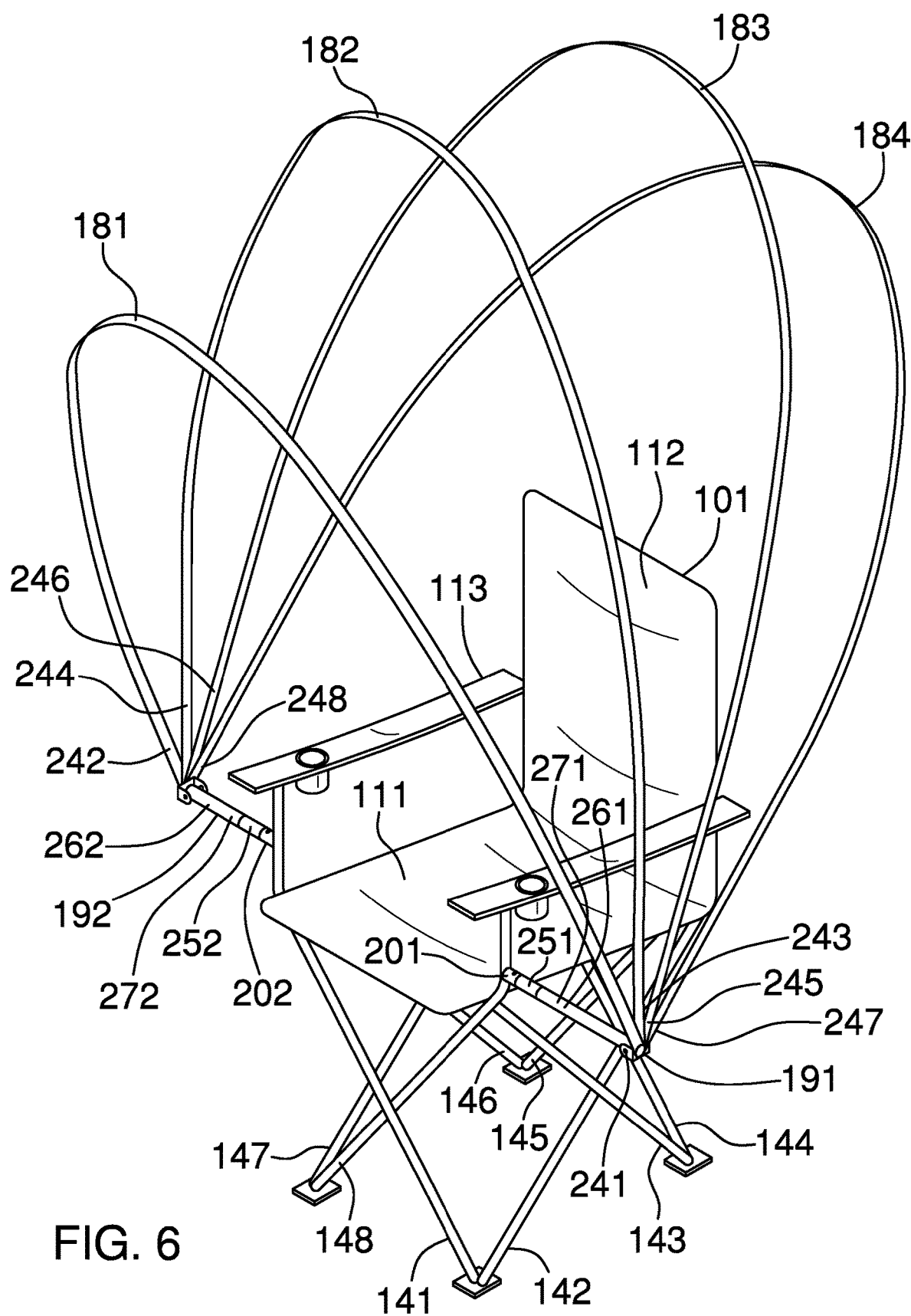
FIG. 6 is a detail view of an embodiment of the disclosure.
Figure 7:
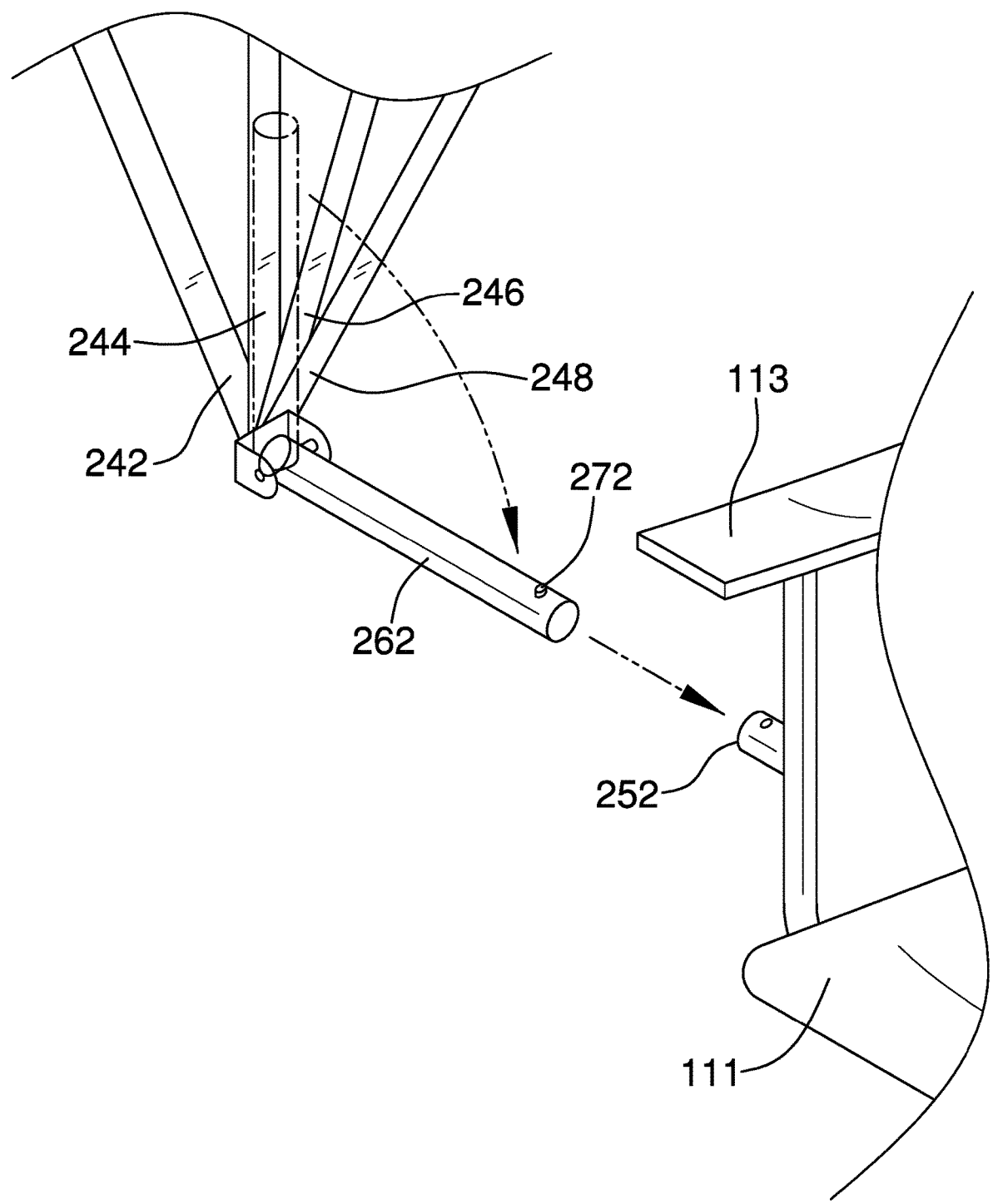
FIG. 7 is a detail view of an embodiment of the disclosure.
Figure 8:
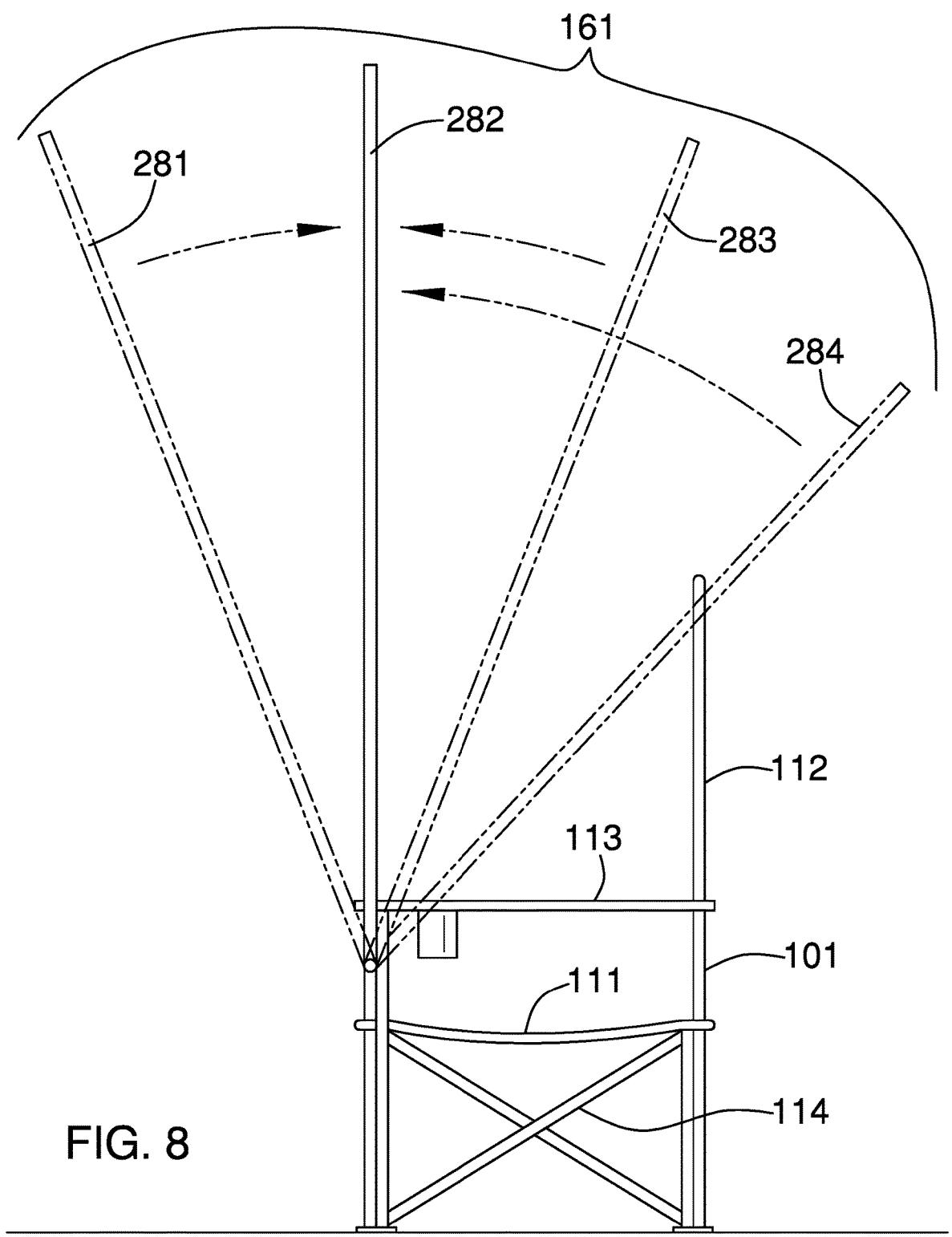
FIG. 8 is a detail view of an embodiment of the disclosure.
Figure 9:
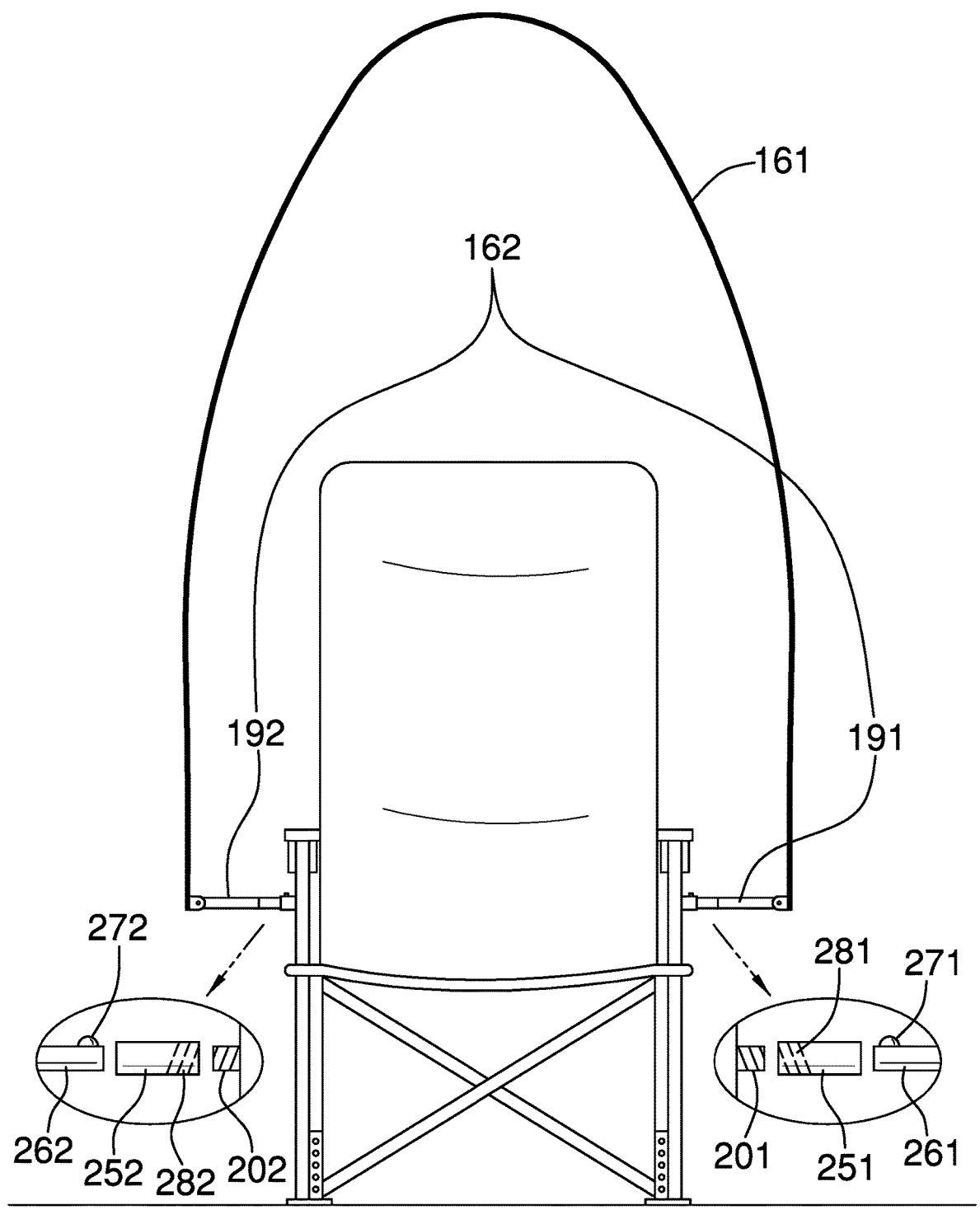
FIG. 9 is a detail view of an embodiment of the disclosure.
Figure 10:
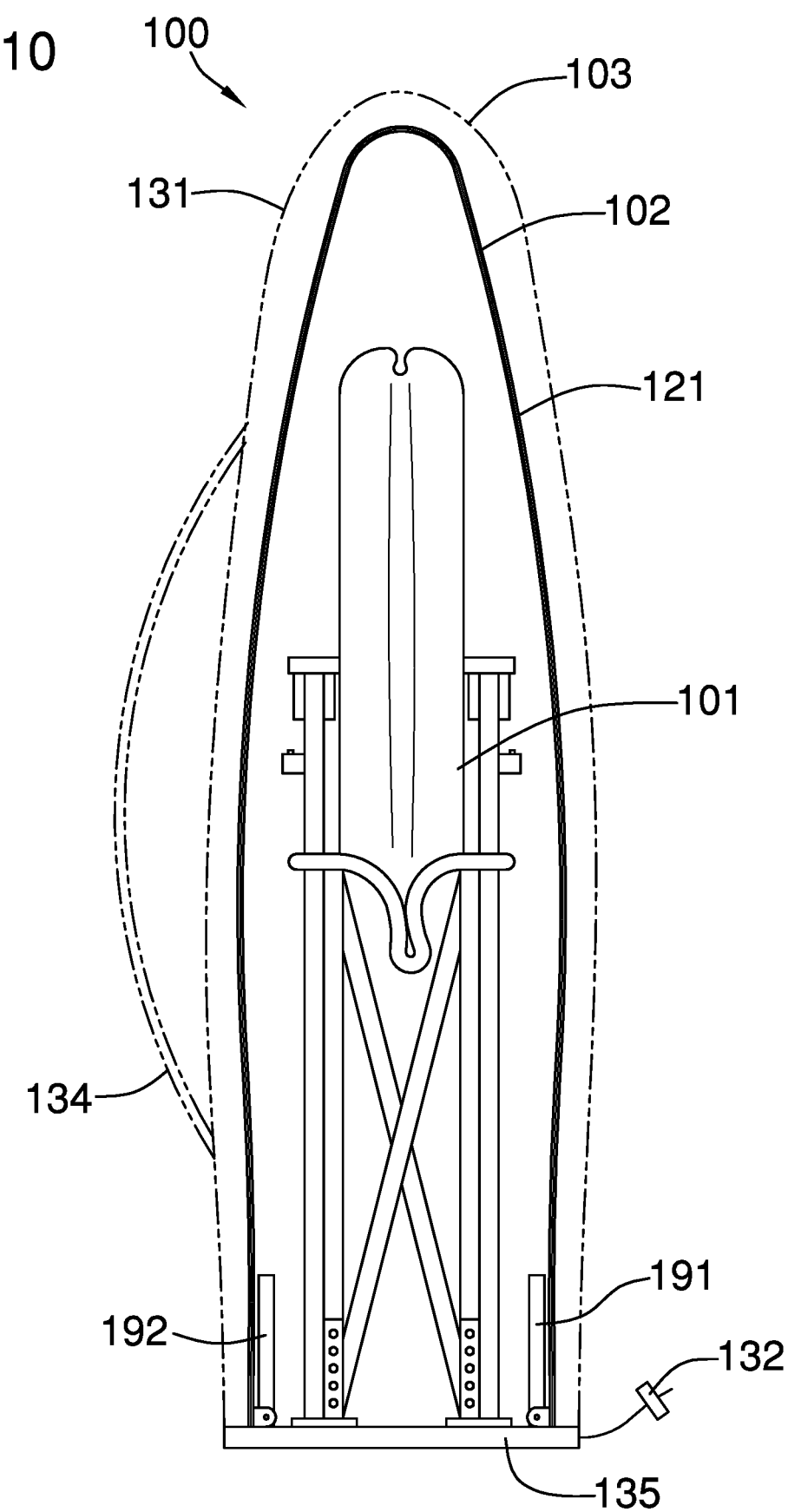
FIG. 10 is a detail view of an embodiment of the disclosure.
Figure 11:
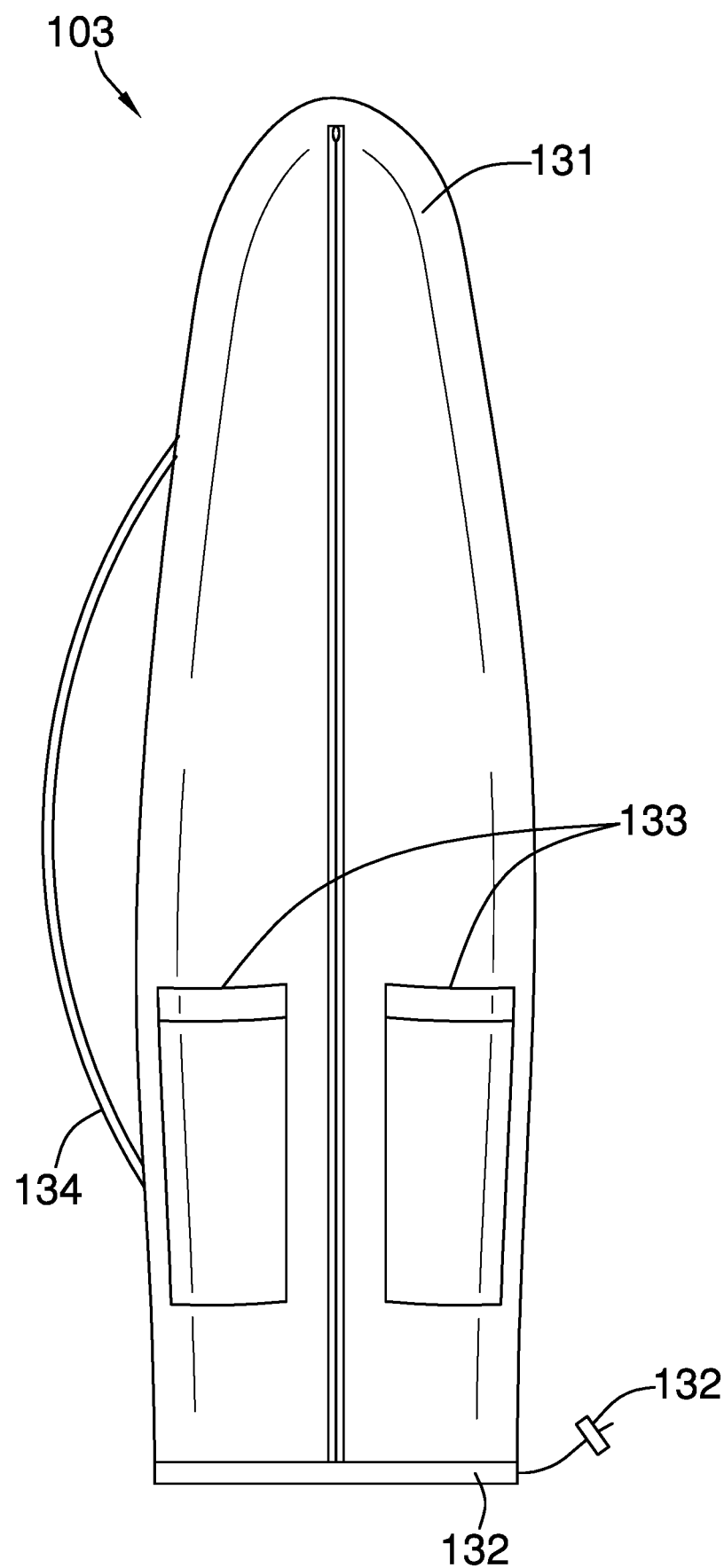
FIG. 11 is a storage view of an embodiment of the disclosure.

Detailed reference will now be made to one or more potential embodiments of the disclosure, which are illustrated in FIGS. 1 through 11.

The portable hunting blind chair 100 (hereinafter invention) is a portable structure. The invention 100 is a hunting blind 102. The invention 100 comprises a chair 101, a blind 102, and a bag 103. The chair 101 is a folding and telescopic structure used for siting. The blind 102 forms an exterior shell around the chair 101. The blind 102 is a collapsible shelter. The blind 102 is adjustable such that the field of view from the blind 102 is adjustable. The blind 102 attaches to the chair 101 using a threaded connection. The bag 103 is a containment structure that contains the invention 100 for transportation and storage.

The chair 101 is a structure configured for use by a person. The chair 101 forms a seat in which the person sits. The chair 101 is a telescopic structure that allows the elevation of the chair 101 to be adjusted. The chair 101 forms the supporting structure on which the blind 102 mounts. The chair 101 raises the blind 102 above the ground on which the chair 101 rests such that the blind 102 forms a shelter around the chair 101. The chair 101 folds for storage within the bag 103. The chair 101 comprises a bench 111, a backrest 112, a plurality of arm rests 113, and a pedestal 114.

The bench 111 forms a horizontally oriented supporting surface on which the person sits. The bench 111 is a well-known and documented structure in the furniture arts. The backrest 112 forms a vertically oriented supporting surface against which the person leans. The backrest 112 is a well-known and documented structure in the furniture arts.

Each of the plurality of arm rests 113 is a structure on which an arm of the person rests. Each of the plurality of arm rests 113 are identical. Each of the plurality of arm rests 113 is a well-known and documented structures in the furniture arts. The backrest 112 and the plurality of arm rests 113 attach to the bench 111.

The pedestal 114 is a pedestal 114 structure that attaches to the bench 111. The pedestal 114 forms a load path that transfers the load borne by the bench 111 to the ground. The pedestal 114 further transfers the load of the blind 102 to the ground. The pedestal 114 is a telescopic structure used to change the elevation of the bench 111. The pedestal 114 comprises a first telescopic leg 141, a second telescopic leg 142, a third telescopic leg 143, a fourth telescopic leg 144, a fifth telescopic leg 145, a sixth telescopic leg 146, a seventh telescopic leg 147, an eighth telescopic leg 148, a first exterior screw thread 201, and a second exterior screw thread 202.

The first telescopic leg 141 is a shaft structure that transfers a portion of the load path of the chair 101 and the blind 102 to the ground. The first telescopic leg 141 is a telescopic structure such that the span of the length of the first telescopic leg 141 is adjustable. The first telescopic leg 141 adjusts the elevation of the bench 111 of the chair 101.

The second telescopic leg 142 is a shaft structure that transfers a portion of the load path of the chair 101 and the blind 102 to the ground. The second telescopic leg 142 is a telescopic structure such that the span of the length of the second telescopic leg 142 is adjustable. The second telescopic leg 142 adjusts the elevation of the bench 111 of the chair 101.

The third telescopic leg 143 is a shaft structure that transfers a portion of the load path of the chair 101 and the blind 102 to the ground. The third telescopic leg 143 is a telescopic structure such that the span of the length of the third telescopic leg 143 is adjustable. The third telescopic leg 143 adjusts the elevation of the bench 111 of the chair 101.

The fourth telescopic leg 144 is a shaft structure that transfers a portion of the load path of the chair 101 and the blind 102 to the ground. The fourth telescopic leg 144 is a telescopic structure such that the span of the length of the fourth telescopic leg 144 is adjustable. The fourth telescopic leg 144 adjusts the elevation of the bench 111 of the chair 101.

The fifth telescopic leg 145 is a shaft structure that transfers a portion of the load path of the chair 101 and the blind 102 to the ground. The fifth telescopic leg 145 is a telescopic structure such that the span of the length of the fifth telescopic leg 145 is adjustable. The fifth telescopic leg 145 adjusts the elevation of the bench 111 of the chair 101.

The sixth telescopic leg 146 is a shaft structure that transfers a portion of the load path of the chair 101 and the blind 102 to the ground. The sixth telescopic leg 146 is a telescopic structure such that the span of the length of the sixth telescopic leg 146 is adjustable. The sixth telescopic leg 146 adjusts the elevation of the bench 111 of the chair 101.

The seventh telescopic leg 147 is a shaft structure that transfers a portion of the load path of the chair 101 and the blind 102 to the ground. The seventh telescopic leg 147 is a telescopic structure such that the span of the length of the seventh telescopic leg 147 is adjustable. The seventh telescopic leg 147 adjusts the elevation of the bench 111 of the chair 101.

The eighth telescopic leg 148 is a shaft structure that transfers a portion of the load path of the chair 101 and the blind 102 to the ground. The eighth telescopic leg 148 is a telescopic structure such that the span of the length of the eighth telescopic leg 148 is adjustable. The eighth telescopic leg 148 adjusts the elevation of the bench 111 of the chair 101.

The inclusion of eight telescopic legs in the pedestal 114 provides the flexibility required to ensure that: a) the elevation of the bench 111 is adjustable to the desired elevation; while ensuring, b) that the bench 111 can be set to a horizontal orientation that is perpendicular to the force of gravity regardless of the orientation of the ground to the force of gravity.

The first exterior screw thread 201 is a post: a) that attaches to the pedestal 114; and that, b) is formed with an exterior screw thread. The second exterior screw thread 202 is a post: a) that attaches to the pedestal 114; and that, b) is formed with an exterior screw thread.

The blind 102 forms the exterior structure of the invention 100. The blind 102 forms an enclosed space that conceals a person. The blind 102 allows the person to observe the environment without detection. The bag 103 is a containment structure. The blind 102 comprises a cover 121, a collapsible support structure 122, a plurality of cords 123, and a plurality of tent stakes 124.

The cover 121 is a structure that forms the exterior surfaces of the blind 102. The cover 121 comprises an exterior sheeting 151, a plurality of windows 152, and a door 153.

In the first potential embodiment of the disclosure, the exterior sheeting 151 is a textile structure. The exterior sheeting 151 is treated with perfluorobutanesulfonic acid (CAS 375-73-5). The exterior sheeting 151 forms the exterior surfaces of the cover 121.

Each of the plurality of windows 152 is an opening formed through the exterior sheeting 151. The plurality of windows 152 allows for a person seated in the chair 101 to view the environment external to the invention 100. The plurality of windows 152 allows for a person seated in the chair 101 to shoot at objects through a window selected from the plurality of windows 152. Each of the plurality of windows 152 can open and close.

The door 153 is an opening formed through the exterior sheeting 151. The door 153 provides access from the exterior of the invention 100 into the interior of the invention 100 for a person and equipment. The door 153 can open and close. The door 153 comprises a fifth slit 215 and a fifth fastener 235. The fifth slit 215 is further defined with a ninth raw edge 229 and a tenth raw edge 230. The fifth slit 215 is a slit cut through the exterior sheeting 151. The fifth slit 215 forms the opening of the door 153. The fifth fastener 235 is a fastener selected from the group consisting of a hook and loop fastener and a zipper. The fifth fastener 235 secures the ninth raw edge 229 to the tenth raw edge 230 of the door 153.

The collapsible support structure 122 is a framework. The collapsible support structure 122 is an openwork structure. The cover 121 drapes over collapsible support structure 122. The collapsible support structure 122 elevates the cover 121 above the ground such that the chair 101 is contained within the collapsible support structure 122. The collapsible support structure 122 attaches to the pedestal 114 of the chair 101 such that the adjustment of the telescopic structure of the pedestal 114 further adjusts the elevation of the cover 121 over the chair 101. The collapsible support structure 122 comprises a plurality of arcuate supports 161 and a plurality of pedestal mounts 162.

Each of the plurality of arcuate supports 161 is a tent pole. Each of the plurality of arcuate supports 161 is identical. Each of the plurality of arcuate supports 161 forms an arch structure which supports the cover 121 when the cover 121 drapes over the plurality of arcuate supports 161. Any initial arcuate support selected from the plurality of arcuate supports 161 rotates relative to any subsequent arcuate structure selected from the plurality of arcuate supports 161 such that the interior space formed by the cover 121 is adjustable.

The plurality of arcuate supports 161 comprises a first arcuate support 181, a second arcuate support 182, a third arcuate support 183, and a fourth arcuate support 184. The first arcuate support 181 is further defined with a first end 241 and a second end 242. The second arcuate support 182 is further defined with a third end 243 and a fourth end 244. The third arcuate support 183 is further defined with a fifth end 245 and a sixth end 246. The fourth arcuate support 184 is further defined with a seventh end 247 and an eighth end 248.

The first arcuate support 181 is a tent pole. The first arcuate support 181 attaches to the first tenon 261 of the first pedestal mount 191 such that the first arcuate support 181 rotates around the first tenon 261. The first arcuate support 181 attaches to the first tenon 261 using a locking mechanism that locks the first arcuate support 181 into a fixed position relative to the first tenon 261. The first arcuate support 181 attaches to the second tenon 262 of the second pedestal mount 192 such that the first arcuate support 181 rotates around the second tenon 262. The first arcuate support 181 attaches to the second tenon 262 using a locking mechanism that locks the first arcuate support 181 into a fixed position relative to the second tenon 262. The first end 241 of the first arcuate support 181 attaches to the first tenon 261. The second end 242 of the first arcuate support 181 attaches to the second tenon 262.

The second arcuate support 182 is a tent pole. The second arcuate support 182 attaches to the first tenon 261 of the first pedestal mount 191 such that the second arcuate support 182 rotates around the first tenon 261. The second arcuate support 182 attaches to the first tenon 261 using a locking mechanism that locks the second arcuate support 182 into a fixed position relative to the first tenon 261. The second arcuate support 182 attaches to the second tenon 262 of the second pedestal mount 192 such that the second arcuate support 182 rotates around the second tenon 262. The second arcuate support 182 attaches to the second tenon 262 using a locking mechanism that locks the second arcuate support 182 into a fixed position relative to the second tenon 262. The third end 243 of the second arcuate support 182 attaches to the first tenon 261. The fourth end 244 of the second arcuate support 182 attaches to the second tenon 262.

The third arcuate support 183 is a tent pole. The third arcuate support 183 attaches to the first tenon 261 of the first pedestal mount 191 such that the third arcuate support 183 rotates around the first tenon 261. The third arcuate support 183 attaches to the first tenon 261 using a locking mechanism that locks the third arcuate support 183 into a fixed position relative to the first tenon 261. The third arcuate support 183 attaches to the second tenon 262 of the second pedestal mount 192 such that the third arcuate support 183 rotates around the second tenon 262. The third arcuate support 183 attaches to the second tenon 262 using a locking mechanism that locks the third arcuate support 183 into a fixed position relative to the second tenon 262. The fifth end 245 of the third arcuate support 183 attaches to the first tenon 261. The sixth end 246 of the third arcuate support 183 attaches to the second tenon 262.

The fourth arcuate support 184 is a tent pole. The fourth arcuate support 184 attaches to the first tenon 261 of the first pedestal mount 191 such that the fourth arcuate support 184 rotates around the first tenon 261. The fourth arcuate support 184 attaches to the first tenon 261 using a locking mechanism that locks the fourth arcuate support 184 into a fixed position relative to the first tenon 261. The fourth arcuate support 184 attaches to the second tenon 262 of the second pedestal mount 192 such that the fourth arcuate support 184 rotates around the second tenon 262. The fourth arcuate support 184 attaches to the second tenon 262 using a locking mechanism that locks the fourth arcuate support 184 into a fixed position relative to the second tenon 262. The seventh end 247 of the fourth arcuate support 184 attaches to the first tenon 261. The eighth end 248 of the fourth arcuate support 184 attaches to the second tenon 262.

The tent pole structure is defined in greater detail elsewhere in this disclosure.

Each of the plurality of pedestal mounts 162 is a mechanical structure that attaches the plurality of arcuate supports 161 to the pedestal 114 of the chair 101. Each of the plurality of pedestal mounts 162 is identical. Each of the plurality of pedestal mounts 162 attaches to the plurality of arcuate supports 161. Each of the plurality of arcuate supports 161 attaches to each of the plurality of pedestal mounts 162 such that each selected arcuate support uses each of the plurality of pedestal mounts 162 as a pivot. The plurality of pedestal mounts 162 further comprises a first pedestal mount 191 and a second pedestal mount 192.

The first pedestal mount 191 is a mechanical structure. The first pedestal mount 191 attaches the plurality of arcuate supports 161 of the blind 102 to the pedestal 114 of the chair 101. The first pedestal mount 191 comprises a first mortise 251, a first tenon 261, and a first detent 271. The first mortise 251 further comprises a first interior screw thread 281.

The first mortise 251 is a hollow prism-shaped shaft structure. The first mortise 251 attaches onto the first exterior screw thread 201 of the pedestal 114. The first interior screw thread 281 is an interior screw thread formed in the first mortise 251. The first exterior screw thread 201 is sized such that the first interior screw thread 281 of the first mortise 251 screws onto the first exterior screw thread 201.

The first tenon 261 is a prism-shaped shaft structure. The first tenon 261 is geometrically similar to the first mortise 251. The first tenon 261 is sized such that the first tenon 261 inserts into the first mortise 251. The first tenon 261 attaches the collapsible support structure 122 to the pedestal 114 of the chair 101 by inserting into the first mortise 251. The first detent 271 is a mechanical structure that secures the first tenon 261 in the first mortise 251.

The second pedestal mount 192 is a mechanical structure. The second pedestal mount 192 attaches the plurality of arcuate supports 161 of the blind 102 to the pedestal 114 of the chair 101. The first pedestal mount 191 is identical to the second pedestal mount 192. The second pedestal mount 192 comprises a second mortise 252, a second tenon 262, and a second detent 272. The second mortise 252 further comprises a second interior screw thread 282.

The second mortise 252 is a hollow prism-shaped shaft structure. The second mortise 252 attaches onto the second exterior screw thread 202 pedestal 114. The second interior screw thread 282 is an interior screw thread formed in the second mortise 252. The second exterior screw thread 202 is sized such that the second interior screw thread 282 of the second mortise 252 screws onto the second exterior screw thread 202.

The second tenon 262 is a prism-shaped shaft structure. The second tenon 262 is geometrically similar to the second mortise 252. The second tenon 262 is sized such that the second tenon 262 inserts into the second mortise 252. The second tenon 262 attaches the collapsible support structure 122 to the pedestal 114 of the chair 101 by inserting into the second mortise 252. The second detent 272 is a mechanical structure that secures the second tenon 262 in the second mortise 252. The use of a detent for this purpose is well-known and documented in the mechanical arts.

The plurality of windows 152 comprises a first window 171, a second window 172, a third window 173, and a fourth window 174.

The first window 171 is an aperture that is formed through the exterior sheeting 151 to allow for observation and shooting through the first window 171. The first window 171 comprises a first slit 211 and a first fastener 231. The first slit 211 is further defined with a first raw edge 221 and a second raw edge 222. The first slit 211 is a slit cut through the exterior sheeting 151. The first slit 211 forms the opening of the first window 171. The first fastener 231 is a fastener selected from the group consisting of a hook and loop fastener and a zipper. The first fastener 231 secures the first raw edge 221 to the second raw edge 222 of the first window 171.

The second window 172 is an aperture that is formed through the exterior sheeting 151 to allow for observation and shooting through the second window 172. The second window 172 comprises a second slit 212 and a second fastener 232. The second slit 212 is further defined with a third raw edge 223 and a fourth raw edge 224. The second slit 212 is a slit cut through the exterior sheeting 151. The second slit 212 forms the opening of the second window 172. The second fastener 232 is a fastener selected from the group consisting of a hook and loop fastener and a zipper. The second fastener 232 secures the third raw edge 223 to the fourth raw edge 224 of the second window 172.

The third window 173 is an aperture that is formed through the exterior sheeting 151 to allow for observation and shooting through the third window 173. The third window 173 comprises a third slit 213 and a third fastener 233. The third slit 213 is further defined with a fifth raw edge 225 and a sixth raw edge 226. The third slit 213 is a slit cut through the exterior sheeting 151. The third slit 213 forms the opening of the third window 173. The third fastener 233 is a fastener selected from the group consisting of a hook and loop fastener and a zipper. The third fastener 233 secures the fifth raw edge 225 to the sixth raw edge 226 of the third window 173.

The fourth window 174 is an aperture that is formed through the exterior sheeting 151 to allow for observation and shooting through the fourth window 174. The fourth window 174 comprises a fourth slit 214 and a fourth fastener 234. The fourth slit 214 is further defined with a seventh raw edge 227 and an eighth raw edge 228. The fourth slit 214 is a slit cut through the exterior sheeting 151. The fourth slit 214 forms the opening of the fourth window 174. The fourth fastener 234 is a fastener selected from the group consisting of a hook and loop fastener and a zipper. The fourth fastener 234 secures the seventh raw edge 227 to the eighth raw edge 228 of the fourth window 174.

The plurality of tent stakes 124 consists of a collection of stakes used to anchor the cover 121 to the ground. Each of the plurality of cords 123 is a cord used to tie the cover 121 to a tent stake selected from the plurality of tent stakes 124.

The bag 103 contains the blind 102 and the chair 101 for transportation and storage. The bag 103 comprises a pouch 131, a drawstring 132, a plurality of pockets 133, and a shoulder strap 134.

The pouch 131 is a containment structure formed from a flexible sheeting material. The pouch 131 forms a container structure with a single opening that is commonly referred to as a bag 103. The pouch 131 is sized to receive the chair 101 and the blind 102 for storage. The pouch 131 further comprises a rouleau 135. The rouleau 135 is a channel formed in the pouch 131. The rouleau 135 is formed around the perimeter of the opening formed in the pouch 131.

The drawstring 132 is a cord and cord lock structure. The drawstring 132 cinches the opening of the pouch 131 into a closed position. The cord of the drawstring 132 is drawn through the rouleau 135. The cord lock of the drawstring 132 maintains a tension on the cord such that secures the pouch 131 in a closed position. The drawstring 132 is a well-known and documented structure in the apparel and textile arts.

The plurality of pockets 133 comprises a plurality of containment spaces formed on the exterior surface of the pouch 131. The pocket is a well-known and documented structure in the apparel and textile arts.

The shoulder strap 134 is a strap that is attached to the exterior surface of the pouch 131. The shoulder strap 134 allows the invention 100 to be carried on a shoulder. The shoulder strap 134 is a well-known and documented structure in the apparel and textile arts.

The following definitions were used in this disclosure:

Anchor: As used in this disclosure, anchor means to hold an object firmly or securely.

Anchor Point: As used in this disclosure, an anchor point is a location to which a first object can be securely attached to a second object.

And/Or: As used in this disclosure, the term and/or is a grammatical conjunction that implies the logical function known as the inclusive or. Specifically, the term and/or implies that at least one and potentially more than one of the plurality of statements joined by the and/or conjunction will be true.

Arcuate: As used in this disclosure, arcuate describes the curve formed by a bent bow.

Backrest: As used in this disclosure, a backrest is a vertical supporting surface formed in a chair or seat.

Bag: As used in this disclosure, a bag is a container made of a flexible material. The bag has a single opening which allows the bag to receive the items to be contained.

Bench: As used in this disclosure, a bench is a horizontal supporting surface formed by a chair.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Chair: As used in this disclosure, a chair is a structure that a person can sit on. Seat is a common synonym for a chair.

Closed Position: As used in this disclosure, a closed position refers to a structure that is in an orientation that prevents passage through a port or an aperture. The closed position is often referred to as an object being "closed." Always use orientation.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Cord: As used in this disclosure, a cord is a long, thin, flexible, and prism-shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Cord Lock: As used in this disclosure, a cord lock is a device that is used to tighten cords or drawstrings without the use of knots.

Correspond: As used in this disclosure, the term correspond is used as a comparison between two or more objects wherein one or more properties shared by the two or more objects match, agree, or align within acceptable manufacturing tolerances.

Detent: As used in this disclosure, a detent is a device for attaching a first object to a second object in a detachable manner such that: 1) the position of the first object relative to the second object is adjustable; and/or, 2) the first object is attached to the second object in a detachable manner.

Disk: As used in this disclosure, a disk is a prism-shaped object that is flat in appearance. Specifically, the surface area of an end of the prism-shaped object that forms the disk is greater than the lateral face of the prism-shaped object that forms the disk. In this disclosure, the ends of the prism-shaped structure that forms the disk are referred to as the faces of the disk.

Door: As used in this disclosure, a door is a movable or removable barrier that is attached to a chamber for the purpose of allowing or preventing access through an aperture into the chamber.

Drape: As used in this disclosure, to drape means to cover an object with a sheeting.

Drawstring: As used in this disclosure, a drawstring is a cord, tape, or webbing contained within a channel that is used to fasten or cinch a textile-based object such as an item of apparel or a textile covering. Generally, the channel and cord are formed as a single textile component (in the form of a tape that is often marketed commercially "Quick Cord") that is sewn as a single unit into the textile-based object after which the cord is released within the channel.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior Screw Thread: An exterior screw thread is a ridge wrapped around the outer surface of a tube in the form of a helical structure that is used to convert rotational movement into linear movement.

Fastener: As used in this disclosure, a fastener is a device that is used to join or affix two objects. Fasteners generally comprise a first element which is attached to the first object and a second element which is attached to the second object such that the first element and the second element join to removably attach the first object and the second object. Common fasteners include, but are not limited to, hooks, zippers, magnets, snaps, buttons, buckles, quick release buckles, or hook and loop fasteners.

Field of View: As used in this disclosure, a field of view refers to one or more angles which delimits an area from which electromagnetic radiation will be sensed by a person or an image sensor.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Framework: As used in this disclosure, a framework refers to the substructure of an object that carries the load path of the object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Ground: As used in this disclosure, the ground is a solid supporting surface formed by the Earth. The term level ground means that the supporting surface formed by the ground is roughly perpendicular to the force of gravity.

Hook and Loop Fastener: As used in this disclosure, a hook and loop fastener is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface. A note on usage: when fastening two objects the hook surface of a hook and loop fastener will be placed on the first object and the matching loop surface of a hook and loop fastener will be placed on the second object without significant regard to which object of the two objects is the first object and which of the two objects is the second object. When the hook surface of a hook and loop fastener or the loop surface of a hook and loop fastener is attached to an object this will simply be referred to as the "hook/loop surface" with the understanding that when the two objects are fastened together one of the two objects will have a hook surface and the remaining object will have the loop surface.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Hyoid: As used in this disclosure, a hyoid refers to a three-sided structure comprising a crossbeam, a first arm, and a second arm. In a hyoid, the first arm and the second arm project away from the crossbeam: 1) in the same direction; 2) at a roughly perpendicular angle to the crossbeam, and, 3) the span of the length of the first arm roughly equals the span of the length of the second arm. Hyoids generally have a U shaped appearance.

Interior Screw Thread: An interior screw thread is a groove that is formed around the inner surface of a tube in the form of a helical structure that is used to convert rotational movement into linear movement.

Lock: As used in this disclosure, a lock is a fastening device that secures a rotating mechanical device into a fixed position.

Mortise: As used in this disclosure, a mortise is a prism-shaped negative spaced formed in an object that is designed to receive a geometrically similar object referred to as a tenon.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Open Position: As used in this disclosure, an open position refers to a structure that is in an orientation that allows passage through a port or an aperture. The open position is often referred to as an object being "open."

Openwork: As used in this disclosure, the term open work is used to describe a structure, often a surface, which is formed with openings that allow for visibility and fluid flow through the structure. Wrought work and meshes are forms of openwork.

Perfluorobutanesulfonic acid: As used in this disclosure, perfluorobutanesulfonic acid (CAS 375-73-5) is a surfactant, technically a fluorosurfactant, which is commonly applied to a textile as a water repellant.

Pivot: As used in this disclosure, a pivot is a rod or shaft around which an object rotates or swings.

Pocket: As used in this disclosure, a pocket is a small pouch or storage space formed into an object. Pockets are often formed by joining a second textile or a second sheeting to a first textile or a first sheeting, respectively, by sewing or heat sealing respectively. Methods to form pockets are well-known and documented in the textile and apparel arts.

Pouch: As used in this disclosure, a pouch is an open space that is bounded by a flexible material.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Raw Edge: As used in this disclosure, a raw edge refers to one of two edges formed when a sheeting is cut through the face of the sheeting. The one or more ends of the slit are called the termination points.

Relaxed Shape: As used in this disclosure, a structure is considered to be in its relaxed state when no shear, strain, or torsional forces are being applied to the structure.

Rouleau: As used in this disclosure, a rouleau is a tube or channel formed on the edge of a textile or sheeting.

Screw: As used in this disclosure, to screw is a verb meaning: 1) to fasten or unfasten (unscrew) a threaded connection; or 2) to attach a helical structure to a solid structure.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Sheeting: As used in this disclosure, a sheeting is a material, such as a paper, textile, a plastic, or a metal foil, in the form of a thin flexible layer or layers.

Shoulder Strap: As used in this disclosure, a shoulder strap is a strap used to carry an object over a shoulder Slit: As used in this disclosure, a slit is a long narrow cut or opening formed in or through an object.

Stake: As used in this disclosure, a stake is a shaft that is driven into a horizontal surface, such as the ground, to serve as an anchor point. Strap: As used in this disclosure a strap is a strip of leather, cloth, or other flexible material, often with a buckle, that is used to fasten, secure, carry, or hold onto something.

Strip: As used in this disclosure, the term describes a long and narrow object of uniform thickness that appears thin relative to the length of the object. Strips are often rectangular in shape.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Telescopic: As used in this disclosure, telescopic is an adjective that describes an object made of sections that fit or slide into each other such that the object can be made longer or shorter by adjusting the relative positions of the sections.

Tenon: As used in this disclosure, a tenon is a prism-shaped structure that fits into a mortise such that the tenon attaches to the mortise. The tenon is geometrically similar to the mortise.

Tent Pole: As used in this disclosure, a tent pole is a semi-rigid prism-shaped shaft structure. The semi-rigid structure of the tent pole has an elastic nature. The tent pole bends into a hyoid-shaped structure used as an arch to support a sheeting or textile.

Textile: As used in this disclosure, a textile is a material that is woven, knitted, braided or felted. Synonyms in common usage for this definition include fabric and cloth.

Threaded Connection: As used in this disclosure, a threaded connection is a type of fastener that is used to join a first tube-shaped and a second tube-shaped object together. The first tube-shaped object is fitted with a first fitting selected from an interior screw thread or an exterior screw thread. The second tube-shaped object is fitted with the remaining screw thread. The tube-shaped object fitted with the exterior screw thread is placed into the remaining tube-shaped object such that: 1) the interior screw thread and the exterior screw thread interconnect; and, 2) when the tube-shaped object fitted with the exterior screw thread is rotated the rotational motion is converted into linear motion that moves the tube-shaped object fitted with the exterior screw thread either into or out of the remaining tube-shaped object. The direction of linear motion is determined by the direction of rotation.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips. Webbings have tensile strength but are too flexible to provide compressive strength and are not suitable for use in pushing objects.

Window: As used in this disclosure, a window is an opening formed in a structure that opens and closes Zipper: As used in this disclosure, a zipper is a fastening device comprising a first chain tape, a second chain tape, and a zipper pull. The first chain tape and the second chain tape are textile webbings formed with interlocking components that form a chain. The chain opened and closed by pulling a slide, called a zipper pull, over the first chain tape, a second chain tape. The individual elements of the chain are called the teeth of the chain.

With respect to the above description, it is to be realized that the optimum dimensional relationship for the various components of the invention described above and in FIGS. 1 through 11 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A hunting structure comprising:
a chair, a blind, and a bag;
wherein the chair is a folding and has a telescopic structure;
wherein the blind forms an exterior shell around the chair;
wherein the blind forms an enclosed space;
wherein the blind is a collapsible structure;
wherein the blind is adjustable such that the field of view from the blind is adjustable;
wherein the blind attaches to the chair using a threaded connection;
wherein the hunting structure is a portable structure;
wherein the chair rests on a supporting surface called the ground;
wherein the chair and blind collapse when not in use so as to be placed inside of the bag;
wherein the chair is a structure configured for use by a person;
wherein the chair forms a seat in which the person sits;
wherein the telescopic structure adjusts the elevation of the chair;
wherein the chair forms the supporting structure on which the blind mounts;
wherein the chair raises the blind above the ground on which the chair rests such that the blind forms a shelter around the chair;
wherein the chair folds for storage within the bag;
wherein the blind forms an exterior structure of the hunting structure;
wherein the chair comprises a bench, a backrest, a plurality of arm rests, and a pedestal;
wherein the backrest and the plurality of arm rests attach to the bench;
wherein the pedestal is a pedestal structure that attaches to the bench;
wherein the bench forms a horizontally oriented supporting surface;
wherein the backrest forms a vertically oriented supporting surface;
wherein each of the plurality of arm rests is a supporting structure;
wherein each of the plurality of arm rests is identical;
wherein the pedestal forms a load path that transfers the load borne by the bench to the ground;
wherein the pedestal further transfers the load of the blind to the ground;
wherein the pedestal is a telescopic structure;
wherein the pedestal adjusts the elevation of the bench;
wherein the blind comprises a cover, a collapsible support structure, a plurality of cords, and a plurality of tent stakes;
wherein the cover drapes over the collapsible support structure;
wherein the plurality of cords and the plurality of tent stakes anchor the cover to the ground;
wherein the collapsible support structure is a framework;
wherein the collapsible support structure is an openwork structure;
wherein the collapsible support structure elevates the cover above the ground such that the chair is contained within the collapsible support structure;
wherein the collapsible support structure attaches to the pedestal of the chair such that the adjustment of the telescopic structure of the pedestal further adjusts the elevation of the cover over the chair;
wherein the collapsible support structure attaches to the pedestal of the chair such that the field of view through the cover is adjustable;

wherein the plurality of tent stakes consists of a collection of stakes used to anchor the cover to the ground;
wherein each of the plurality of cords is a cord used to tie the cover to a tent stake selected from the plurality of tent stakes.

2. The hunting structure according to claim 1
wherein the cover comprises an exterior sheeting, a plurality of windows, and a door;
wherein the exterior sheeting is a textile structure;
wherein the exterior sheeting is treated with perfluorobutanesulfonic acid (CAS 375-73-5).

3. The hunting structure according to claim 2
wherein each of the plurality of windows is an opening formed through the exterior sheeting;
wherein the plurality of windows provides visibility into the environment external to the hunting structure;
wherein each of the plurality of windows can open and close;
wherein the door is an opening formed through the exterior sheeting;
wherein the door provides access from the exterior of the hunting structure into the interior of the hunting structure;
wherein the door can open and close.

4. The hunting structure according to claim 3
wherein the collapsible support structure comprises a plurality of arcuate supports and a plurality of pedestal mounts;
wherein the plurality of pedestal mounts attach each of the plurality of arcuate supports to the pedestal.

5. The hunting structure according to claim 4
wherein each of the plurality of arcuate supports is a tent pole;
wherein each of the plurality of arcuate supports is identical;
wherein each of the plurality of arcuate supports forms an arch structure over which the cover drapes;
wherein any initial arcuate support selected from the plurality of arcuate supports rotates relative to any subsequent arcuate structure selected from the plurality of arcuate supports such that the interior space formed by the cover is adjustable.

6. The hunting structure according to claim 5
wherein each of the plurality of pedestal mounts is a mechanical structure;
wherein each of the plurality of pedestal mounts attaches the plurality of arcuate supports to the pedestal of the chair;
wherein each of the plurality of pedestal mounts is identical;
wherein each of the plurality of pedestal mounts attaches to the plurality of arcuate supports;
wherein each of the plurality of arcuate supports attaches to each of the plurality of pedestal mounts such that each selected arcuate support uses each of the plurality of pedestal mounts as a pivot.

7. The hunting structure according to claim 6
wherein the plurality of pedestal mounts further comprises a first pedestal mount and a second pedestal mount;
wherein the first pedestal mount is a mechanical structure;
wherein the first pedestal mount attaches the plurality of arcuate supports of the blind to the pedestal of the chair;
wherein the first pedestal mount comprises a first mortise, a first tenon, and a first detent;
wherein the first mortise attaches to the pedestal;
wherein the first tenon attaches to the first mortise;
wherein the first detent secures the first tenon to the first mortise;
wherein the second pedestal mount comprises a second mortise, a second tenon, and a second detent;
wherein the second mortise attaches to the pedestal;
wherein the second tenon attaches to the second mortise;
wherein the second detent secures the second tenon to the second mortise.

8. The hunting structure according to claim 7 wherein the first pedestal mount is identical to the second pedestal mount.

9. The hunting structure according to claim 8
wherein the plurality of arcuate supports comprises a first arcuate support, a second arcuate support, a third arcuate support, and a fourth arcuate support;
wherein the first arcuate support is further defined with a first end and a second end;
wherein the second arcuate support is further defined with a third end and a fourth end;
wherein the third arcuate support is further defined with a fifth end and a sixth end;
wherein the fourth arcuate support is further defined with a seventh end and an eighth end;
wherein the first arcuate support attaches to the first tenon of the first pedestal mount such that the first arcuate support rotates around the first tenon;
wherein the first arcuate support attaches to the second tenon of the second pedestal mount such that the first arcuate support rotates around the second tenon;
wherein the first arcuate support attaches to the second tenon using a locking mechanism that locks the first arcuate support into a fixed position relative to the second tenon;
wherein the second arcuate support attaches to the first tenon of the first pedestal mount such that the second arcuate support rotates around the first tenon;
wherein the second arcuate support attaches to the second tenon of the second pedestal mount such that the second arcuate support rotates around the second tenon;
wherein the third arcuate support attaches to the first tenon of the first pedestal mount such that the third arcuate support rotates around the first tenon;
wherein the third arcuate support attaches to the second tenon of the second pedestal mount such that the third arcuate support rotates around the second tenon;
wherein the fourth arcuate support attaches to the first tenon of the first pedestal mount such that the fourth arcuate support rotates around the first tenon;
wherein the fourth arcuate support attaches to the second tenon of the second pedestal mount such that the fourth arcuate support rotates around the second tenon.

10. The hunting structure according to claim 9
wherein the first arcuate support attaches to the first tenon using a locking mechanism that locks the first arcuate support into a fixed position relative to the first tenon;
wherein the second arcuate support attaches to the second tenon using a locking mechanism that locks the second arcuate support into a fixed position relative to the second tenon;
wherein the third arcuate support attaches to the first tenon using a locking mechanism that locks the third arcuate support into a fixed position relative to the first tenon;
wherein the third arcuate support attaches to the second tenon using a locking mechanism that locks the third arcuate support into a fixed position relative to the second tenon;

wherein the fourth arcuate support attaches to the first tenon using a locking mechanism that locks the fourth arcuate support into a fixed position relative to the first tenon;
wherein the fourth arcuate support attaches to the second tenon using a locking mechanism that locks the fourth arcuate support into a fixed position relative to the second tenon.

11. The hunting structure according to claim 10
wherein the first mortise is a hollow prism-shaped shaft structure;
wherein the first mortise further comprises a first interior screw thread;
wherein the first interior screw thread is an interior screw thread formed in the first mortise;
wherein the first mortise attaches onto the first exterior screw thread of the pedestal;
wherein the first exterior screw thread is sized such that the first interior screw thread of the first mortise screws onto the first exterior screw thread;
wherein the first tenon is a prism-shaped shaft structure;
wherein the first tenon is geometrically similar to the first mortise;
wherein the first tenon is sized such that the first tenon inserts into the first mortise;
wherein the first tenon attaches the collapsible support structure to the pedestal of the chair by inserting into the first mortise;
wherein the first detent is a mechanical structure that secures the first tenon in the first mortise.

12. The hunting structure according to claim 11
wherein the second mortise is a hollow prism-shaped shaft structure;
wherein the second mortise further comprises a second interior screw thread;
wherein the second interior screw thread is an interior screw thread formed in the second mortise;
wherein the second mortise attaches onto the second exterior screw thread of the pedestal;
wherein the second exterior screw thread is sized such that the second interior screw thread of the second mortise screws onto the second exterior screw thread;
wherein the second tenon is a prism-shaped shaft structure;
wherein the second tenon is geometrically similar to the second mortise;
wherein the second tenon is sized such that the second tenon inserts into the second mortise;
wherein the second tenon attaches the collapsible support structure to the pedestal of the chair by inserting into the second mortise;
wherein the second detent is a mechanical structure that secures the second tenon in the second mortise.

13. The hunting structure according to claim 12
wherein the plurality of windows comprises a first window, a second window, a third window, and a fourth window;
wherein the first window comprises a first slit and a first fastener;
wherein the first slit is further defined with a first raw edge and a second raw edge;
wherein the first slit is a slit cut through the exterior sheeting;
wherein the first slit forms the opening of the first window;
wherein the first fastener secures the first raw edge to the second raw edge of the first window;
wherein the second window comprises a second slit and a second fastener;
wherein the second slit is further defined with a third raw edge and a fourth raw edge;
wherein the second slit is a slit cut through the exterior sheeting;
wherein the second slit forms the opening of the second window;
wherein the second fastener secures the third raw edge to the fourth raw edge of the second window;
wherein the third window comprises a third slit and a third fastener;
wherein the third slit is further defined with a fifth raw edge and a sixth raw edge;
wherein the third slit is a slit cut through the exterior sheeting;
wherein the third slit forms the opening of the third window;
wherein the third fastener secures the fifth raw edge to the sixth raw edge of the third window;
wherein the fourth window comprises a fourth slit and a fourth fastener;
wherein the fourth slit is further defined with a seventh raw edge and an eighth raw edge;
wherein the fourth slit is a slit cut through the exterior sheeting;
wherein the fourth slit forms the opening of the fourth window;
wherein the fourth fastener secures the seventh raw edge to the eighth raw edge of the fourth window;
wherein the door comprises a fifth slit and a fifth fastener;
wherein the fifth slit is further defined with a ninth raw edge and a tenth raw edge;
wherein the fifth slit is a slit cut through the exterior sheeting;
wherein the fifth fastener secures the ninth raw edge to the tenth raw edge of the door.

14. The hunting structure according to claim 12
wherein the bag comprises a pouch, a drawstring, a plurality of pockets, and a shoulder strap;
wherein the pouch is formed from a flexible sheeting material;
wherein the pouch forms a container structure with a single opening;
wherein the pouch is sized to receive the chair and the blind for storage;
wherein the pouch further comprises a rouleau;
wherein the rouleau is a channel formed in the pouch;
wherein the rouleau is formed around the perimeter of the opening formed in the pouch;
wherein the drawstring is a cord and cord lock structure;
wherein the drawstring cinches the opening of the pouch into a closed position;
wherein the cord of the drawstring is drawn through the rouleau;
wherein the cord lock of the drawstring maintains a tension on the cord such that secures the pouch in a closed position;
wherein the plurality of pockets comprises a plurality of containment spaces formed on the exterior surface of the pouch;
wherein the shoulder strap is a strap that is attached to the exterior surface of the pouch;
wherein the shoulder strap allows the hunting structure to be carried on a shoulder.

15. The hunting structure according to claim 14
wherein the first fastener is a fastener selected from the group consisting of a hook and loop fastener and a zipper;
wherein the second fastener is a fastener selected from the group consisting of a hook and loop fastener and a zipper;
wherein the third fastener is a fastener selected from the group consisting of a hook and loop fastener and a zipper;
wherein the fourth fastener is a fastener selected from the group consisting of a hook and loop fastener and a zipper;
wherein the fifth fastener is a fastener selected from the group consisting of a hook and loop fastener and a zipper.

\* \* \* \* \*